United States Patent [19]
Andrews

[11] 3,721,900
[45] March 20, 1973

[54] MICROWAVE DETECTION INSTRUMENT AND ANTENNA THEREFOR

[75] Inventor: Charles Luther Andrews, Albany, N.Y.

[73] Assignee: General Electric Company, Schenectady, N.Y.

[22] Filed: April 15, 1971

[21] Appl. No.: 134,142

[52] U.S. Cl. .................324/95, 343/703, 343/742
[51] Int. Cl. .............................................G01r 23/04
[58] Field of Search ........324/95; 343/703, 797, 854, 343/742

[56] References Cited

UNITED STATES PATENTS

| | | | |
|---|---|---|---|
| 3,464,010 | 8/1969 | Saul | 324/95 |
| 3,354,459 | 11/1967 | Schwartz et al. | 343/854 |
| 3,540,057 | 11/1970 | Persson et al. | 343/703 |
| 3,056,926 | 10/1962 | Borck et al. | 325/67 |
| 3,634,888 | 1/1972 | Reidy | 343/867 |
| 3,611,382 | 10/1971 | Gray | 343/703 |

FOREIGN PATENTS OR APPLICATIONS

| | | | |
|---|---|---|---|
| 533,591 | 2/1941 | Great Britain | 324/95 |

*Primary Examiner*—Eli Lieberman
*Attorney*—Paul A. Frank, John F. Ahern, Julius J. Zaskalicky, Frank L. Neuhauser, Oscar B. Waddell and Joseph B. Forman

[57] ABSTRACT

An instrument for detecting microwave energy over half a total solid angle in space and capable of measuring either plane or elliptically polarized waves in all directions employs an antenna having three geometrically and electrically symmetrical diode detector circuits connected in parallel to detect both electrical and magnetic fields, the sole source of power for the circuits being the microwaves detected, the total output current of the parallel circuits being supplied to a meter.

12 Claims, 10 Drawing Figures

PATENTED MAR 20 1973  3,721,900
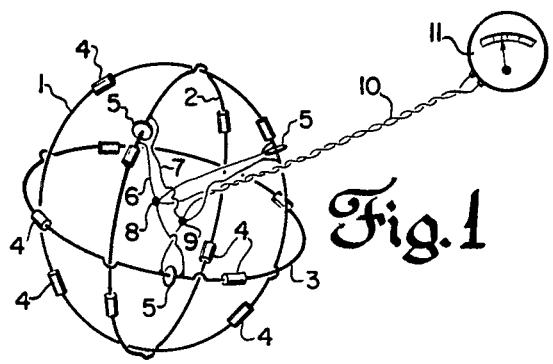
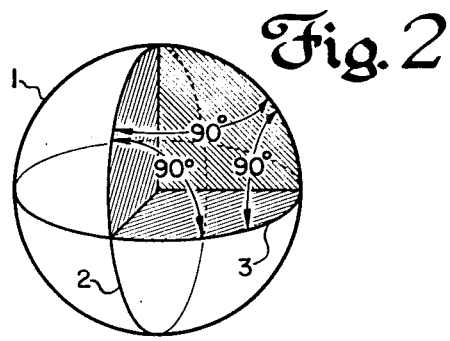
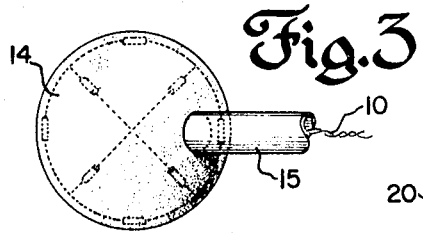
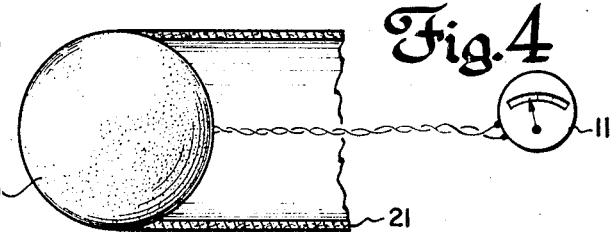
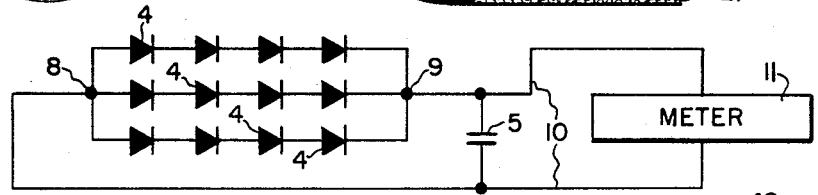
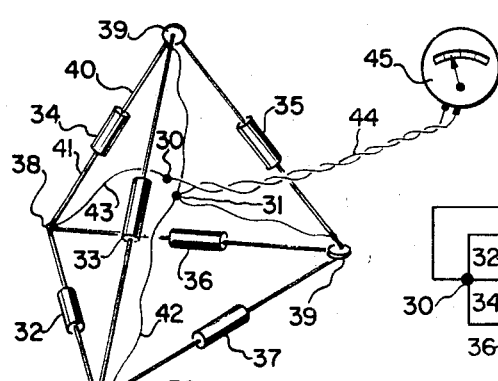
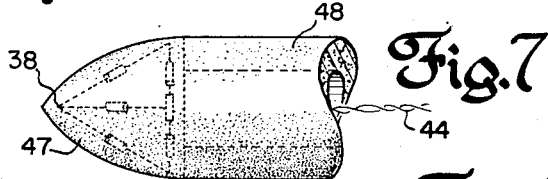
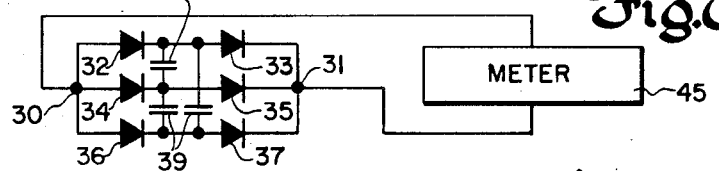
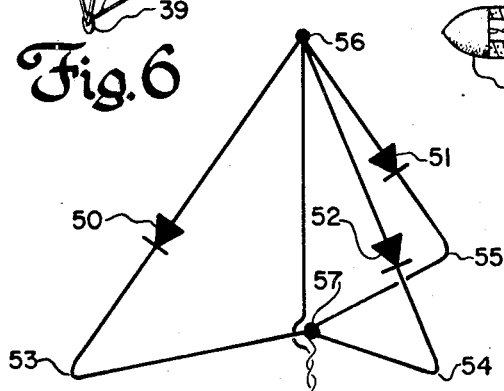
INVENTOR
CHARLES L. ANDREWS
BY Paul A. Frank
HIS ATTORNEY

MICROWAVE DETECTION INSTRUMENT AND ANTENNA THEREFOR

My invention relates to microwave radiation sensors and in particular to instruments for detecting leakage radiation.

Microwave energy is employed in numerous different ways and each such use presents certain health hazards to the user. Typical of electronic products producing potentially harmful microwave energy are microwave communication relays, modern medical diathermy machines, some industrial heating installations, and microwave ovens. In consumer products, as contrasted with manufacturing and laboratory applications, the source of microwave power is generally contained in a completely shielded enclosure having interlocks to prevent access while the microwave source is operating. Despite manufacturers' efforts to provide completely shielded enclosures and other safety features for such sources, studies indicate that many consumer products utilizing microwave energy emit radiation in excess of recommended health levels.

One of the problems in determining the safety of consumer products employing microwave energy is the lack of instrumentation for quickly and easily detecting and quantitatively measuring leakage from products employing microwave energy. The fields to be measured in many instances are extremely complex due to the crossing of several beams or reflections. Presently available microwave detection instruments are of either the thermal or the electrical type. The former rely upon the production of detectable change in temperature in a thermally sensitive element and measuring that change by electrical means. Such thermal detectors usually employ either a thermistor which is heated by coupling to the electromagnetic field or a thermocouple which produces a voltage when heated by currents supplied by a pickup antenna. The electrical type of microwave sensor typically employs a semiconductor diode or rectifier to convert high frequency currents supplied by an antenna to unidirectional currents to be measured by a direct current meter.

Both types of detectors require an antenna to convert the propagated radio frequency wave into radio frequency currents which are then detected by either a thermistor, a thermocouple, or a diode. Such antenna determines the major characteristics of the measuring instrument so that the accuracy of measurements is subject to the directionality and polarization sensitivity of the antenna. If the antenna is directionally sensitive, then orientation of the antenna becomes critical. Because health hazards are presented by quantities of radiation rather than upon direction, it is desirable that a micro-wave sensor be able to scan quantitatively a region for hazardous radiation without having to give attention to orientation of the sensor.

Polarization of an electromagnetic wave, i.e., the direction of the electric field vector, may vary from random polarization where the electric vector is varying in orientation, to plane polarization, where the electric vector is fixed in orientation, or elliptical polarization, where the vector is rotating in orientation at the radio frequency. Because no single antenna will respond to all polarizations simultaneously, polarization independence requires the use of at least two antennas capable of measuring different polarizations.

The waves in the near region of antennas, cracks or other sources of microwave radiation are largely evanescent waves. The electric and magnetic waves are not in phase or necessarily traveling in the same direction. Thus, examination of low level microwave fields in the neighborhood of a microwave oven reveals traveling waves over the entire surface of the oven and standing waves over the surface of the oven door. The oven door, itself, is in fact a low level microwave antenna with a peak of electric field normal to the surface at the center of the door where the waves from the edge of the door arrive in phase with each other. The direction of travel and polarization of the waves outside an oven is also affected by neighboring cabinets. Thus, a probe for detecting hazardous radiation from such a source should be sensitive to all directions of radiation and polarization.

It is a primary object of my invention to provide a detector of microwave energy which is neither direction nor polarization sensitive.

It is another object of my invention to provide a detector of microwave energy capable of coupling with and detecting both electrical and magnetic fields.

It is another object of my invention to provide a detector of microwave energy which is inexpensive, self-contained, and requires no external source of power.

It is another object of my invention to provide a detector of microwave energy which is both temperature and time invariant.

Still another object of my invention is to provide a new and improved omnidirectional antenna.

In its broadest aspect, my invention consists in providing a microwave detector which includes a geometrically and electrically symmetrical antenna in the form of three parallel connected diode detector circuits, the circuits being supported in mutually intersecting planes, the total output current of the parallel circuits being measured by conventional current measuring instruments. The parallel connected diode detector circuits are arranged to measure microwave energy over half a total solid angle in space. In one form the detectors are arranged in a spherical configuration while in an alternative form they are disposed in a pyramidal configuration.

The subject matter which I regard as my invention is particularly pointed out and distinctly claimed in the concluding portion of this specification. The invention, however, both as to its organization and method of operation, together with further objects and advantages, may best be understood by reference to the following description taken in connection with the accompanying drawings wherein like reference characters refer to like elements and in which:

FIG. 1 is a sketch illustrating a spherical antenna employed in the instrument of my invention;

FIG. 2 illustrates orientation of the detectors in the instrument of FIG. 1;

FIG. 3 illustrates the antenna of FIG. 1 in encapsulated form;

FIG. 4 illustrates another embodiment of the antenna of FIG. 1;

FIG. 5 is a circuit diagram of a microwave instrument embodying the antenna of FIG. 1;

FIG. 6 illustrates an antenna having a pyramidal arrangement of diode detectors;

FIG. 7 illustrates the tip of a probe embodying the pyramidal antenna of FIG. 6;

FIG. 8 is a circuit diagram of a microwave detector embodying the antenna of FIG. 6;

FIG. 9 is a cross-sectional view of a microwave detection instrument of my invention; and FIG. 10 is another modification of the antenna employed in a microwave detecting instrument of my invention.

In the microwave detector of FIG. 1, three conductive loops 1, 2, 3 are arranged in mutually intersecting transverse planes. Each loop contains four crystal-diode-detectors 4 evenly spaced in the loop and in electrical series connection in that loop. The microwave frequency circuit of each loop is completed by a disk 5 of insulating material such as mica. The portions of each loop intermediate the spaced detectors 4 may be formed of copper wire and disk 5 is attached to the ends of the copper wire by a conducting epoxy cement. A pair of leads 6, 7 of a high resistance wire are connected to each loop at opposite sides of disk 5, leads 6 from the loops being joined at a point 8 and leads 7 at a point 9. Twisted leads 10 of fine high resistance wire are connected to points 8, 9 to supply the output currents of the three parallel loops to a meter 11 which may be, for example, a milliammeter or a microammeter. The value of the inductance of each loop and the value of the capacitance formed by disks 5 are such that each loop is resonant at the frequency of waves to be detected. In the case of a microwave oven, this frequency will be either 915 megahertz or 2450 megahertz. FIG. 2 illustrates how each of loops 1–3 is mutually perpendicular to the other two loops.

An antenna having the construction shown in FIG. 1 and in which each circular loop is resonated by the capacitor 5 is omnidirectional that is, capable of detecting and rectifying electromagnetic waves from any direction. When such an antenna is pointed in any particular direction, it is capable of intercepting and detecting microwave energy over half a total solid angle in space. In constructing an antenna of this type, each loop with its associated detectors is preferably supported on a material which is nonreflecting of waves to be detected. One suitable material is polymethacrylate rod or tubing bent in a circular shape. While any suitable crystal diode detector may be employed for the detectors 4, I have found that a semiconductor type such as Sylvania Electric Co. silicon detector Type 1N82AG may be employed. In operating such an antenna I have found that my combination of diode detectors and conductive loops detects both electrical and magnetic fields. Furthermore, such an antenna is both geometrically and electrically symmetrical. The detector is capable of receiving and measuring either plane or elliptically polarized waves from any direction. As a result, when such a detector is brought near the door of a microwave oven, for example, the detector is capable of measuring all standing electric and magnetic waves as well as traveling waves over the surface of the oven.

In FIG. 3 the antenna of FIG. 1 is shown as embedded near the surface of a solid sphere of material which is transparent to microwaves. A suitable material for such purpose is foamed polystyrene. Sphere 14 of such material and containing the embedded diodes and conductive loops may be supported by tube 15 which likewise is highly transparent to microwaves and which may consist, for example, of varnished paper tubing. Leads 10 may extend in such tubing from their junction with the conductive loops of the antenna to a meter 11 at the other end of the tubing.

FIG. 4 illustrates an embodiment of my microwave detector in which the embedded antenna structure 20 is supported by a hollow tubing 21. In this form of the invention, the circular loops of the antenna may have a length less than one wavelength of the microwaves to be detected so that the detector is very small in size and can be applied to cracks and small openings of the product using microwave energy. With such decreased size, the individual loops are no longer resonant so that the sensitivity of the complete detector is slightly less than that of a detector having resonant loops.

The circuit diagram of FIG. 5 shown how each loop consists of four diodes 4 connected in series with a capacitance 5. The three loops are in parallel and are connected together at points 8, 9, conductors 10 supplying the output currents of the three parallel circuits to meter 11.

FIG. 6 illustrates my antenna in pyramidal form with a diode-crystal-detector at the center of each of the six edges of the pyramid. In this manner, three parallel circuits, each having two diodes connected in series, are connected between terminals 30, 31. One such circuit comprises diodes 32, 33. A second circuit if formed by diodes 34, 35, and the third circuit by diodes 36, 37. The three circuits have a common junction point 38 connected to terminal 30. The other end of each circuit is terminated by a capacitance 39 formed by interposition of a disk of insulating material, such as mica, connected between the end of the conductor connected to the second diode of each circuit and the midpoint of one of the other circuits. Conductors such as copper wires 40, 41 are attached to each diode to support that diode midway between two corners of the pyramid. The disk forming capacitors 39 may be cemented with an epoxy and insulate the end of each circuit from the junction, or corner point, of the adjacent circuit of the pyramid. Fine wires 42 are connected between point 31 and the ends of the three circuits and fine wire 43 is connected between terminal point 30 and point 38 of the pyramid. Wires 42, 43, preferably are formed of a high resistance wire which does not cast a microwave shadow. A pair of twisted wires 44 joins terminals 30, 31 to an output indicator or meter 45. The pyramidal antenna formed by the three parallel circuits is thus both geometrically and electrically symmetrical. If point 38 is the apex of such a pyramid, terminals 30, 31 preferably lie in the base of the pyramid formed by the three corners containing capacitors 39.

In FIG. 7 the pyramidal antenna of FIG. 6 is illustrated as encapsulated in a conventional foamed polystyrene material 47 having a tubular portion 48 which is hollow and through which leads 44 are brought to a connected meter.

FIG. 8 is a circuit diagram of the pyramidal antenna of FIG. 6 and shows how each of the three parallel circuits connected between the terminals 30, 31 consists of two series connected diodes, capacitances 39 being connected between the midpoints of the pairs of diodes.

FIG. 9 is a cross-sectional view of a microwave detector instrument which may include in its tip 60 either the spherical antenna of FIG. 1 or the pyramidal antenna of FIG. 6. The encapsulating material for the antenna continues as a hollow tubular portion 61 to permit the antenna leads to be connected to meter 45. The instrument may be formed as a compact pistol-shape type of probe which can be easily held by the user to move from point to point to measure leakage microwave radiation and which is simple and rugged in structure. The meter 45 may be calibrated in milliwatts per square centimeter to facilitate measurements of leakage radiation. With this construction, the leakage detector may be made so small that the antenna may be held near the cracks of any enclosure containing microwave energy.

FIG. 10 illustrates schematically a form of my antenna in which omnidirectionality is sacrificed slightly in favor of simplicity and ruggedness. The pyramidal construction of such antenna employs only three crystal diodes, 50, 51, 52 connected in parallel circuits. Three loops are formed by bending the leads of the diodes at points 53, 54, 55 and soldering them together at points 56, 57. After so forming the antenna and attaching meter leads to points 56, 57, the antenna preferably is embedded in a material transparent to microwaves.

The antennas of FIGS. 1, 6 and 10 have high omnidirectionality. In the spherical antenna of FIG. 1, each circular loop is resonant and one wavelength in circumference. While the three circuits of the pyramidal antenna are usually not resonant, particularly when the antenna is of very small size, the antenna itself is highly omnidirectional.

An important advantage of my instrument for measuring microwave energy is that it is completely independent of external power or internal batteries, the sole source of power being the microwave leakage energy. Meters 11 or 45 employed in the instrument may be 1 milliampere meters having small time constant. The complete instrument thus is formed of relatively inexpensive material and is rugged in construction. The antenna is capable of coupling with and measuring either plane or elliptically-polarized waves in all directions so that the instrument is independent of the direction in which it is pointed or of any kind of polarization of waves being detected. Furthermore, the instrument has no time delay but gives immediate response and is highly stable over a long period of time.

While I have shown and described several embodiments of my invention, it will be apparent to those skilled in the art that various changes and modifications may be made without departing from the invention in its broader aspects. I, therefore, intend the appended claims to cover all such changes and modifications as fall within the true scope and spirit of my invention.

What I claim as new and desire to secure by Letter Patent of the United States is:

1. An instrument for detecting microwave energy over half a total solid angle in space comprising three parallel connected resonant loop diode detector circuits, each circuit comprising a conductive loop and including at least one diode detector, said circuits being positioned in mutually intersecting planes and means measuring the additive total rectified output current of said parallel circuits.

2. The detector of claim 1 in which the planes are perpendicular to each other.

3. The detector of claim 2 in which each circuit four series-connected diode detectors lying substantially in a circular loop and the detectors of the three circuits lie substantially on the surface of a sphere.

4. The detector of claim 3 in which each circuit has an electrical length equal an integral number of wavelength of waves to be detected.

5. The detector of claim 3 in which each circular loop is formed of curved conductors and the four diodes are substantially evenly spaced in each loop.

6. The detector of claim 5 in which the loops are embedded in a material transparent to microwaves.

7. The detector of claim 1 in which the planes form the sides of a pyramid.

8. The detector of claim 7 in which each circuit includes two series-connected diode detectors, each detector being located along an edge of the pyramid.

9. An omnidirectional antenna comprising three conductive loops supported in mutually intersecting planes, each loop including at least one diode detector, a capacitance terminating each loop, and circuit means connecting said three loops in parallel.

10. The antenna of claim 9 in which each conductive loop is circular in form, contains four diode detectors spaced approximately 90 degrees apart in the loop, and is disposed in a plane perpendicular to the planes of the remaining two loops.

11. The antenna of claim 9 in which each loop is triangular in form and forms the side of a pyramid.

12. The antenna of claim 11 in which each loop includes one diode detector, corresponding leads of the detector being connected together to form terminals for the antenna.

* * * * *